United States Patent [19]
Hundley et al.

[11] 3,931,624
[45] Jan. 6, 1976

[54] ANTENNA ARRAY FOR AIRCRAFT GUIDANCE SYSTEM

[75] Inventors: Warren Hundley, Upper Saddle River, N.J.; Michael A. Eovine, Woburn, Mass.

[73] Assignee: Tull Aviation Corporation, Armonk, N.Y.

[22] Filed: Mar. 21, 1974

[21] Appl. No.: 453,347

[52] U.S. Cl. ............... 343/768; 343/771; 343/840; 343/108 R
[51] Int. Cl.² .................. H01Q 13/10; H01Q 19/14
[58] Field of Search ........... 343/768, 771, 777, 840, 343/108 R

[56] References Cited
UNITED STATES PATENTS

| | | |
|---|---|---|
| 2,437,281 | 3/1948 | Tawney .............................. 343/777 |
| 3,078,463 | 2/1963 | Lamy .................................. 343/771 |
| 3,135,959 | 6/1964 | Moran ................................ 343/771 |
| 3,156,917 | 11/1964 | Parmeggiani ...................... 343/840 |
| 3,267,472 | 8/1966 | Fink ................................... 343/854 |
| 3,604,010 | 9/1971 | Schwartz et al. .................. 343/771 |

*Primary Examiner*—Eli Lieberman
*Attorney, Agent, or Firm*—Curtis Ailes

[57] ABSTRACT

The antenna array preferably consists of a plurality of slotted wave guide microwave signal radiating elements positioned to directly radiate separate beams of microwave energy at different azimuth angles to a common horizontally aligned cylinder sector reflector, the radiating elements being operable to primarily determine the direction and shape of the resultant reflected beams in azimuth and the reflector being operable to primarily determine the elevation patterns of the resultant reflected beams.

15 Claims, 5 Drawing Figures

ANTENNA ARRAY FOR AIRCRAFT GUIDANCE SYSTEM

CROSS REFERENCES TO RELATED U.S. PATENTS

U.S. Pat. Application Ser. No. 299,586 filed Oct. 20, 1972 now U.S. Pat. No. 3,806,935 by Donald J. Toman for a RADIO NAVIGATIONAL AID WITH SEPARATE STANDARD FREQUENCY SIGNAL and assigned to the same assignee as the present application.

U.S. Pat. No. 3,774,214 issued Nov. 20, 1973 to Donald J. Toman and Lloyd J. Perper for SCANNING BEAM GUIDANCE METHOD AND SYSTEM and assigned to the same assignee as the present application.

U.S. Pat. Application Ser. No. 198,389 filed Nov. 15, 1971 now U.S. Pat. No. 3,793,597 by Donald J. Toman for MODULATION SYNTHESIS METHOD AND APPARATUS and assigned to the same assignee as the present application.

This invention relates to an antenna array which is useful for aircraft guidance systems, and more particularly for use with a transmitter for transmitting localizer guidance signals for microwave instrument landing systems.

Aircraft instrument landing systems for operation at microwave frequencies have recently been developed which employ a plurality of narrow angularly spaced beams containing navigation information and defining a course plane in space. The course plane in space is defined by modulating the carrier for the beams on one side of the course plane with a predominance of 90 Hz modulating frequency, and modulating the carrier for the beams on the other side of the course plane with a predominance of 150 Hz modulating frequency. When the aircraft detects that the 90 Hz and 150 Hz modulation signals are equal, it is on the defined course plane.

There are a number of problems in providing a high performance low cost antenna system for radiating the plurality of narrow angularly spaced beams. One of the most serious problems in economically achieving high performance is the problem of radiating a narrow beam with a minimum of unwanted beam side lobes.

Accordingly, it is one object of the invention to provide an antenna system which is characterized by economy in construction and high performance, particularly in producing well defined narow beams which are angularly spaced apart, and in which side lobe radiation is minimized.

Another problem, when the separate beams are to be used to define a course in azimuth (commonly referred to as a "localizer" function) is that, while the beams are angularly spaced out in azimuth, a uniform elevation position and shape is desired for each of the beams such that each beam includes a sharply defined high energy pattern at the lower beam edge portion, and a less sharply defined and lower energy pattern in the upper elevation portions.

In a microwave instrument landing system of the type described above, the central beams of the beam array are prefably narrow, in the order of 6° wide, and the side lobes for each beam should be kept low, typically minus fifteen decibels or less. The elevation sector to be covered by the azimuth (localizer) beams extends from the horizon to a substantial angle above the horizon. Preferably the maximum signal strength is at an elevation angle corresponding generally to the angle of the glide path. The elevation characteristic of the beams should be such that there is a sharp fall-off in signal intensity from about 0.75° to zero degrees with respect to the horizon so that there is good signal coverage at angles as low as 0.75°, but a minimization of reflection from the ground. At the upper elevations, the azimuth beams should fall off in strength much more slowly in order to provide coverage and guidance at the higher angles. This represents a non-symmetrical beam shape in elevation.

It is essential that the azimuth beam characteristics such as beam width, shape, gain of each beam relative to each of the other beams, pointing angle, side lobe level, and polarization should be as uniform as possible over the entire elevation sector.

Accordingly, another important object of the invention is to provide an improved antenna array system for the localizer function in a microwave instrument landing system with a plurality of narrow beams angularly spaced apart in azimuth in which the beams are all uniformly and consistently positioned and shaped in elevation to provide a sharply defined high energy pattern at the lower beam edge portion and a less sharply defined and lower energy pattern in the upper elevation portions thereof, and having a high degree of uniformity in the elevation pattern for all of the beams.

Further objects and advantages of the invention will be apparent from the following description and the accompanying drawings.

In carrying out the invention, in a preferred embodiment, there is provided an antenna array for radiating a pattern of angularly spaced microwave radio beams which are particularly useful to provide localizer signals for instrument guidance of aircraft comprising a radiation reflector in the form of a sector of a concave cylinder, said reflector being arranged facing in a substantially horizontal direction and such that the parallel cylinder generation element lines thereof are substantially horizontal, a plurality of slotted wave guide microwave signal radiating elements horizontally positioned and arranged to direct microwave energy directly to said reflector for reflection thereby, said radiating elements being positioned and operable to direct radiation in separate beams to said reflector at different azimuth angles and such that the center lines of said beams are in substantial alignment in elevation within a common plane, the reflected beams having uniform elevation patterns as determined primarily by the cylindrical curvature and the elevation rotational position of said radiation reflector and substantially independent of the different azimuth angles of said beams, and the reflected beams having different azimuth angles and selected azimuth patterns determined primarily by the radiation characteristics of said radiating elements and substantially independent of the characteristics of said radiation reflector.

Figure 1:
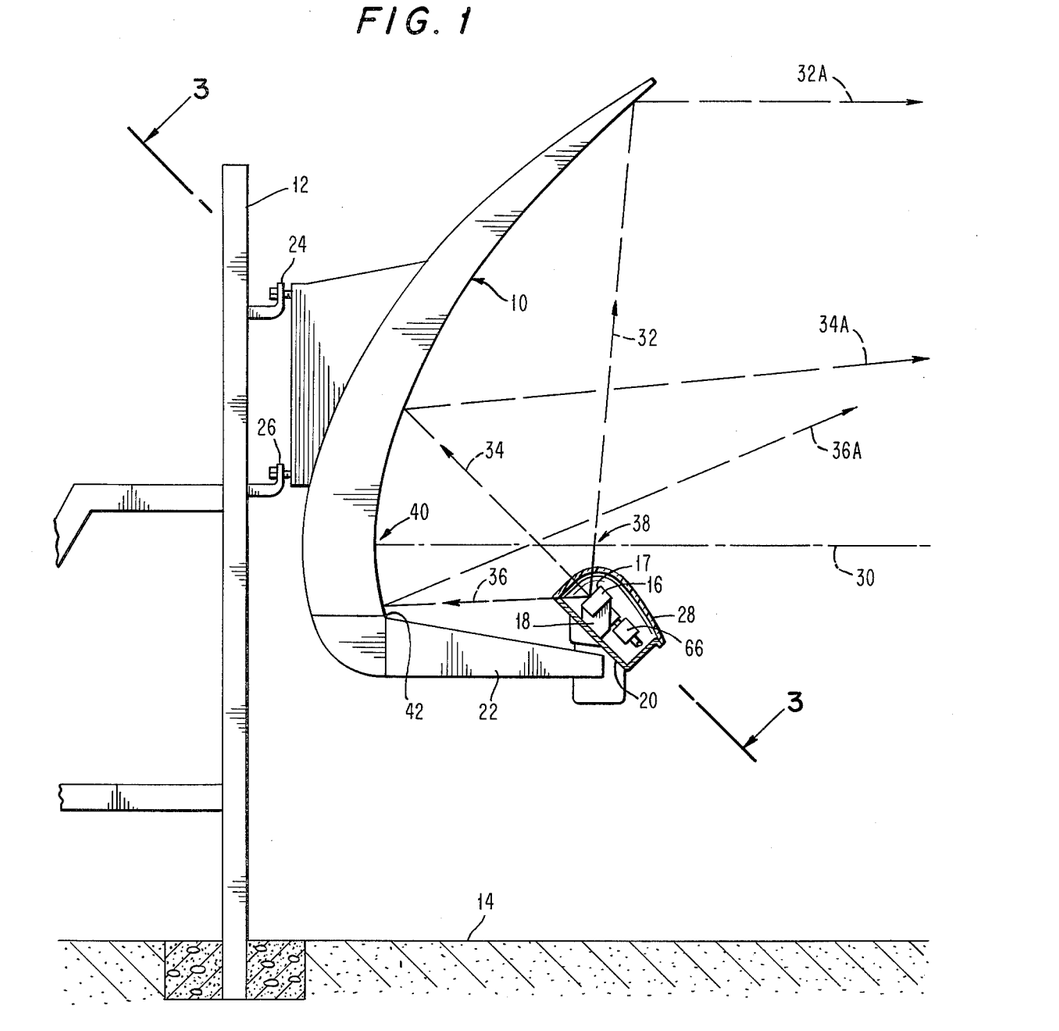
FIG. 1 is a side view of a preferred embodiment of the antenna array of the invention illustrating a common reflector structure and the position of the radiating elements.

Referring more particularly to FIG. 1, there is shown a side view of a preferred embodiment of the invention including a horizontally aligned cylindrical reflector 10 which is mounted and supported upon a suitable supporting frame 12 above the level of the airport runway which is served, as indicated at 14. While 14 is referred to as indicating the level of the runway, it will be understood that the apparatus is normally positioned beyond the roll-out end of the runway which is served, the end opposite to the end approached by an aircraft for landing.

The antenna array includes a number of radiating elements, preferably consisting of slotted wave guides, indicated at 16 which radiate beams of microwave energy from slotted faces 17 to the reflector 10, as indicated by the dotted lines 32, 34, 36 in the drawing. While there are a number of slotted wave guide radiators at 16, they are generally arranged in a straight line which is parallel to the axis of the cylindrical reflector 10 so that only the near end of the first slotted wave guide radiator is visible in FIG. 1. The plan view showing all of the wave guides and their general arrangement with respect to the reflector is shown in FIG. 3 which is described more fully below.

Referring again to FIG. 1, the slotted wave guides 16, which may also be referred to as radiating elements, are supported by means of suitable individual supporting brackets 18 upon a common mounting plate 20 for all of the wave guides. The mounting plate 20 is, in turn, mounted and supported upon a pair of booms 22 which are attached to the lower portion of the structure of the reflector 10. Thus, the positions of the slotted wave guides 16 are fixed with relation to the reflector 10 because of the secure mechanical interconnection by the common mounting plate 20 and the booms 22. This entire assembly is supported upon the frame 12 by means of three or more attachments indicated at 24 and 26. Attachments 24 and 26 are preferably designed so that the entire reflector assembly can be precisely adjusted in position with respect to the frame 12 for aiming purposes. The wave guides 16 are preferably protected by a synthetic resin cover 28, sometimes referred to as a "radome," (shown in section) which protects them from the elements, but does not interfere with the radiation of microwave energy.

Figures 3, 4:
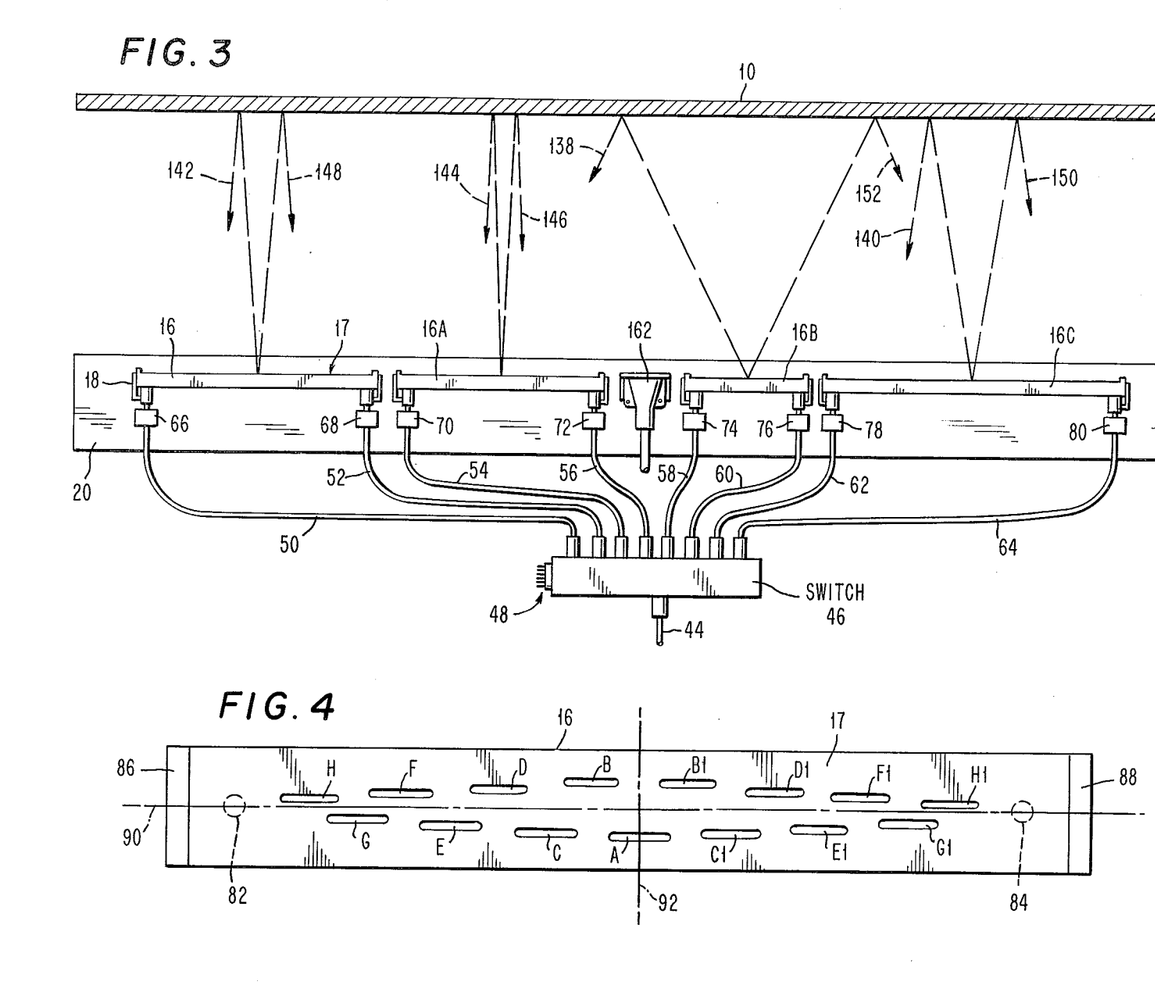
FIG. 3 is a plan view which is partially schematic in nature, and partly in section, of the structure of FIG. 1 and taken at section 3—3 of FIG. 1.
FIG. 4 is a face view of the slotted face of a typical slotted wave guide radiating element employed in the embodiment of FIG. 1.

The wave guides 16 are designed to provide separate radiation component beams at different azimuth angles as explained more fully in connection with FIG. 3. However, the beams are substantially identical in the elevation aspect, as illustrated in connection with FIG. 1. The reflector 10 has been referred to as a cylindrical reflector. The term "cylindrical," as used in defining this reflector, refers to the broad dictionary definition of the term "cylinder," that is: the surface traced by a straight line, called generatrix or element, moving parallel to a fixed straight line. A large part of the upper portion of reflector 10 represents a modified parabolic cylinder. The reflector is normally positioned so that the axis plane 3 of the parabola is substantially horizontal. This means also that the generation element lines (the different stations of the generatrix which generated the cylindrical surface) are all horizontal. Stated another way, the curvature of the cylindrical surface is exclusively in the vertical dimension.

The following explanation of the structure and operation of the antenna array, including the reflector 10, assumes that the electromagnetic microwave radiation obeys geometrical optical principles of reflection. This is an aid in understanding of the operation of the apparatus. However, it should be understood that there is appreciable diffusion of the microwave radiation so that geometrical optical principles do not explain the operation of the apparatus completely. Furthermore, various factors such as relative phase relationships of the different parts of the radiated beams are also important.

The microwave beams radiated by the slotted wave guides 16 are relatively wide in the elevation dimension as illustrated in FIG. 1. One major function of reflector 10 is to narrow these beams in the elevation dimension. Various illustrative individual portions or elements of the microwave beams are illustrated at 32, 34, and 36. 32 represents very nearly the uppermost portion of the beam, 34 represents the center portion of the beam (aligned with the center-line of the wave guide), and 36 represents the lower marginal edge portion of the beam. While the design may be carried out with many variations, the invention is described in terms of the preferred embodiment. For instance, the mounting plate 20 is preferably supported at an angle of about 45 degrees to the horizontal. Accordingly, the center lines of all of the radiating elements 16, and the center portions 34 of the beams are directed upwardly at an angle of 45° in a common plane. The beam portions 32, 34, and 36 are each reflected from the reflector 10 and result in the respective reflected beam portions 32A, 34A, and 36A.

The focus of the parabolic portion of the reflector 10 is located at, or very near, the intersection of the axis 30 with the beam portion 32, as indicated at 38. It is a characteristic of a parabolic reflector that, insofar as they obey geometrical optical principles, electromagnetic radiations from a point source at the focus of the reflector are reflected in paths which are parallel to the reflector axis. In the present structure, the portion of the microwave radiation represented by line 32 follows this principle. While the radiating elements 16 are located offset from the focus, the offset position is such that the radiation indicated by line 32 is treated by the reflector as though it had originated at the focus since it is aligned in exactly the same direction as it would have been if it originated from the focus. Thus, the reflected beam portion at 32A is exactly horizontal, and parallel to the axis plane 30.

The offset of the radiating elements 16 from the focus of the parabola is somewhat exaggerated in the drawing, and it is preferable to have the radiating elements positioned in the very near vicinity of the focus of the parabola.

While the reflector surface is described as a parabola, the configuration is preferably modified somewhat away from a true parabola in order to obtain the desired radiation pattern in elevation with the greatest possible efficiency. For instance, this cylindrical reflector surface is preferably generated in accordance with a formula suggested for the generation of the center line of a spherical microwave reflector in Formula 6 appearing in connection with FIG. 5 on pages 1290 and 1291 of a technical paper by A. S. Dunbar entitled "Calculation of Doubly Curved Refelctors for Shaped Beams" published in the Proceedings of the IRE, volume 36, pp. 1289–1296, October 1948. While the formulas appearing in that article are primarily directed to doubly curved reflectors, in accordance with the present invention, it has been discovered that the formula for the center line reflector shape is effective for a cylindrical reflector. Following the teachings of that technical paper, the lower sector of the effective portion of the reflector 10 from somewhat above the intersection 40 of the axis 30 with the refelctor, and extending down to the lower marginal edge, indicated at 42, may preferably have a sharper curvature, and may merge into a shape more generally corresponding to a circular cylinder sector.

Because of the shape and configuration of the surface of reflector 10, it is apparent that the reflected beam elements such as 36A, 34A, and 32A cross one another in a reversal of these reflected beam elements. Thus, the upper portion of the radiation reflector determines the character of the lower portions of the reflected beams, and the lower portion of the reflector determines the character of the upper portions of the reflected beams. Furthermore, it is apparent that the paths of all of these reflected beam portions lie above the position of the radiating elements 16 so that these directly reflected beam portions are not intercepted by the radiating elements and the associated supporting structures.

Since the focus plane 30 is substantially horizontal, it is quite evident that the reflector 10 may be described as facing in a substantially horizontal direction, and as presenting a concave cylinder surface for the reflection of the microwave energy.

In a preferred physical embodiment, the reflector 10, from the bottom corner 42 to the upper tip of the reflector may have a vertical dimension of 1.85 meters. When properly adjusted, the common center line of the slotted faces 17 of the slotted wave guides 16 may be spaced in the order of 67.3 centimeters horizontally from the bottom corner 42 of the reflector, and 7.6 cm. above the bottom corner 42 of the reflector. The axis plane 30 is spaced vertically upward from the lower corner 42 of the reflector about 23 cm., and the horizontal dimension from the lower tip 42 of the reflective surface to the upper tip of the reflective surface, when the reflector 10 is adjusted with the axis plane 30 horizontal, is about 94 cm.

Figure 2:
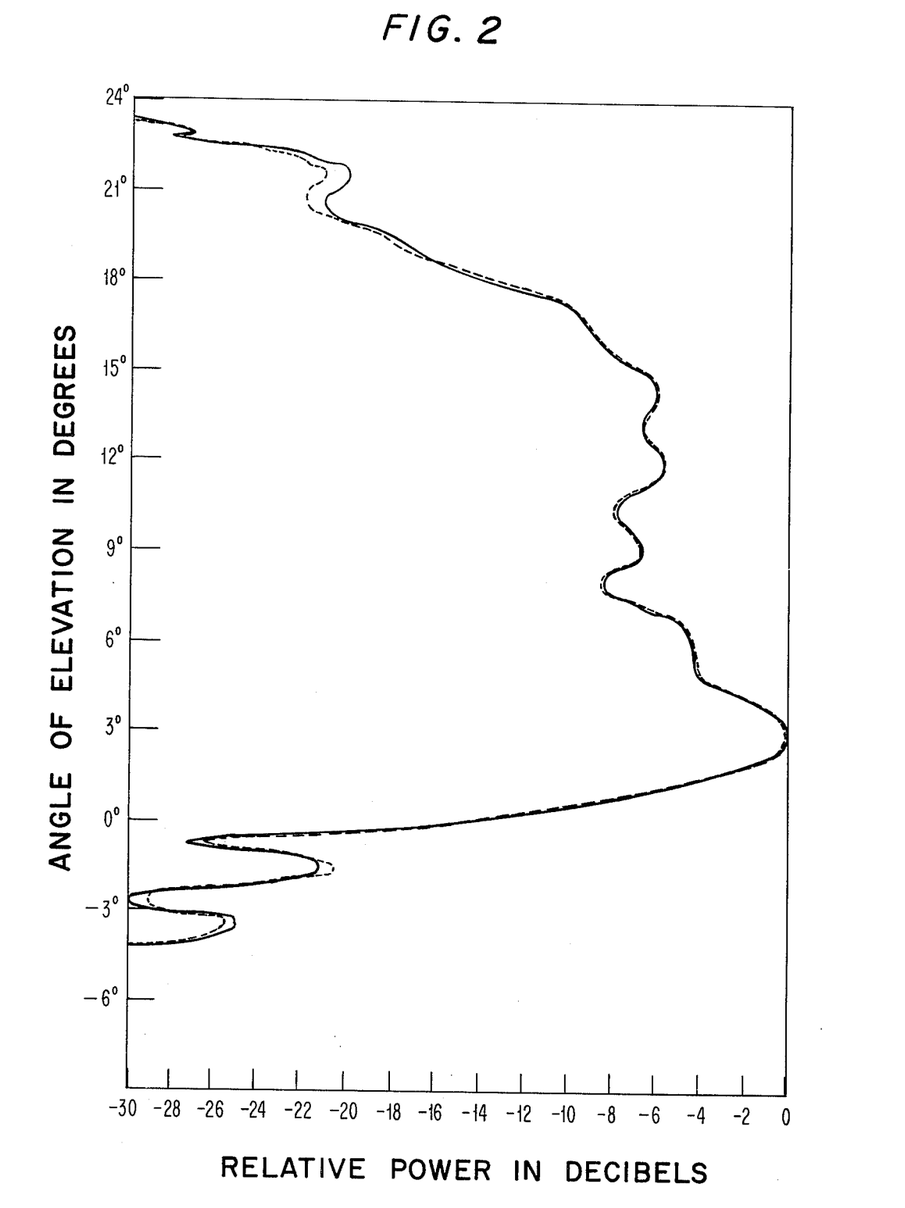
FIG. 2 is a graphic representation of the elevation pattern of signal strength versus elevation angle of two beams obtained from the antenna array embodiment illustrated in FIG. 1.

FIG. 2 illustrates idealized test plots illustrating the signal patterns in terms of signal strength versus angle of elevation for two different beams produced by the structure of FIG. 1 at different azimuth angles. One pattern is shown by a dotted line, and the other by a solid line. These plotted relative signal strengths were taken at the azimuth center lines for the two azimuth beams aligned most clearly to the course plane in space defined by the apparatus. These are the beams shown and described below in connection with FIGS. 3 and 5 and identified as beams 144 and 146.

It is to be seen from FIG. 2 that the shape of the beams in elevation, as determined primarily by the reflector 10, provides a very desirable distribution of radiation energy for the purpose of a landing system because the signal strength is the greatest at an elevation of about three degrees above the horizon, and there is a rapid fall-off in the beam signal intensities from the three degree elevation to the zero degree elevation (corresponding to the horizon). The three degree angle of maximum signal intensity is desirable because the glide path is typically at about a three angle of inclination. Furthermore, it is desirable to have a rapid decrease in the energy intensity in the vicinity of the horizon in order to avoid reflections of radiations from the ground which would reduce the accuracy of the total information received by the aircraft. At higher angles of elevation, the signal falls off more gradually. This is a desirable signal pattern because localizer information should be available to the landing aircraft even though it may be above the normal glide path.

It is one of the very important features of the invention that the elevation patterns are relatively uniform for all of the different azimuth beams, relatively independently of the azimuth angles and independent of other azimuth pattern characteristics such as beam width. This is because the reflector is a cylindrical reflector, curved only in the vertical direction, and the elevation patterns are determined primarily by the curvature and reflection characteristics of the reflector 10. The close coincidence of the two patterns shown in FIG. 2 illustrates this principle. On the other hand, since the reflector is not curved in the horizontal direction, the azimuth patterns of the beams are substantially independent of the characteristics of the reflector 10. Accordingly, the azimuth characteristics of the various beams can be determined independent of the reflector, and primarily by design of the radiating elements, as explained more fully below in connection with FIGS. 3, 4, and 5. Thus, in changing or evolving a particular antenna array following the teachings of the present invention, it is possible to change the elevation patterns of all of the beams by modifying the curvature of the reflector 10, without any need for changing the radiating elements 16, and without any substantial modification to the azimuth patterns. Furthermore, it is possible to modify the azimuth patterns by changing the radiating element designs, without changing the elevation patterns.

It is evident from the above description, and the information imparted by FIGS. 1 and 2, that the beams are all substantially narrowed in elevation by the beam pattern forming characteristics of the reflector 10.

FIG. 3 is a simplified plan view of the antenna array embodiment of FIG. 1, partly schematic, and partly in section, and omitting details of the antenna structure, such as the boom 22, in order to promote clarity in the understanding of the operation of the invention. The slotted wave guides collectively referred to in FIG. 1 by reference to 16 are individually shown in FIG. 3 at 16, 16A, 16B, and 16C. Each slotted wave guide is preferably capable of being fed from each end with a separate switched beam signal, and the spacing of the slots in each wave guide is arranged to provide a desired angular deviation of the beam of microwave energy away from a direction normal to the slotted face of the wave guide. This is referred to as a "squint" angle. The direction of the squint angle depends upon which end of the wave guide is driven. Accordingly, by driving each wave guide alternately from either end, two separate beams are obtainable from each slotted wave guide symmetrically oriented on opposite sides of the normal to the slotted face of the wave guide. This avoids the need for providing a separate slotted wave guide for each beam, and thus reduces the over-all size and cost of the apparatus.

The incoming energy from a microwave transmitter is applied at 44 to a microwave switch device 46. The microwave switch device 46 operates in response to switching control signals received at 48 to distribute the microwave energy in a switching sequence to the various coaxial feed lines 50-64. The coaxial feed lines 50-64 are connected to the wave guides through isolators 66-80. Each isolator permits the signal from the associated coaxial cable to be transmitted through to the associated end of the associated wave guide, but the isolator acts as a non-reflective load with respect to any part of the signal fed to the opposite end of the wave guide which is not completely radiated and dissipated by the coupling of energy provided by the slots in the face of the wave guide. Thus, the isolator 66 permits the signal from the associated coaxial cable 50 to be coupled through to the inside of the left end of the slotted wave guide radiator 16 for the generation of a microwave beam 142, but the isolator 68 operates as a non-reflective load for the signal supplied from the coaxial cable 50 so that the signal is not coupled back through the coaxial cable 52, and it is not reflected from the right end of the wave guide 16. Similarly, the signal on coaxial cable 52 is permitted to pass through the isolator 68 for coupling to the right end of the wave guide 16 to generate a beam 148, and any undissipated energy from that source is absorbed by the isolator 66. In similar fashion, the signal applied to each end of each wave guide is operable completely independent of the signal applied to the opposite end of that wave guide to produce an independent microwave beam.

The various beams of microwave energy emitted by the slotted wave guide radiators are graphically shown by dotted lines representing the center lines of individual beams, and illustrating how the beams are emitted by the slotted wave guides and reflected from the reflector 10. Thus, wave guide 16 emits the beams respectively represented by the center lines 142 and 148, wave guide 16A emits beams 144 and 146, wave guide 16B emits beams 138 and 152, and wave guide 16C emits beams 140 and 150.

The numbers applied to the individual beams in the immediately preceding passage are arranged in an order such that the beam 138 which is deflected the farthest to the left is represented by the lowest number, and the beam 152 deflected the farthest to the right is represented by the highest number, and the others are all numbered according to their alignment in terms of angle of deflection to the left and then to the right. These beam numbers are the same as the numbering for the representations of the corresponding beams in the schematic circuit diagram of FIG. 5 which is described more fully below.

Most of the wave guides 16-16C are designed with the slots spaced so as to provide a "backward" squint of the radiated beam. This means that the beam resulting from a signal supplied to a particular end of a wave guide is deflected away from a direction normal to the face of that wave guide toward the end which is being fed. Thus, the signal on coaxial cable 50 supplied to the left end of wave guide 16 results in the beam 142, and the signal from coaxial cable 52 results in the beam 148. The backward squint also applies to wave guide 16B where the signal from coaxial cable 58 produces beam 138 and the signal from cable 60 produces beam 152. Similarly, the signal from cable 62 produces beam 140 from wave guide 16C and the signal from cable 64 produces beam 150. It is possible to design the slotted wave guides to have any desired squint angle, within reasonable limits, including forward squint angles as well as backward squint angles. However, in one physical embodiment, it has been found that the backward squint designs produce lower undesired side-lobe radiations, particularly where larger squint angles are required. However, for the smallest squint angle wave guide 16A, the side-lobe radiation problem has not been found to be serious, with either forward or backward squint, and better results in other respects have been achieved so far with a forward squint design. Accordingly, in the wave guide radiator 16A, the signal from coaxial cable 54 generates the forward squinted beam 146, and the signal from coaxial cable 56 generates the forward squinted beam 144.

The navigation plane defined by the system is a plane (illustrated at 154 in FIG. 5) which is normal to each of the wave guides 16-16C, and which theoretically should intersect with the transverse center line of each of the wave guides. Thus, ideally, the wave guides should issue their individual beams from a common transverse center line. However, this is not possible when the wave guides are to be positioned on a common horizontal line parallel to the reflector in order to provide uniform beam elevation patterns. But it has been found that, since the separation of the transverse center lines of the separate wave guides is very small in relation to the dimensions of the signal field, for practical purposes a single navigational plane is defined by the system.

In a preferred embodiment, with the eight beam array represented in FIG. 3, the squint angle for the radiator 16A which emits the beams which are closest to the navigational plane, is 1.8°. Thus, the beams 144 and 146 are 3.6° apart. The squint angle for wave guide radiator 16, which radiates the next wider spaced beams, is 4.5°. Thus, the spacing between the beams 142 and 148 is a total of 9°. Also, the spacing between beam 142 and the next adjacent beam 144 from wave guide radiator 16A is 2.7°. The squint angle for radiator 16C, which emits the next wider spaced beams 140 and 150, is 9°, thus providing an angular spacing between beam 140 and beam 142 of 4.5°. Finally, the beams having the widest spacing, sometimes referred to herein as the "cover" beams 138 and 152 are emitted from wave guide radiating element 16B at a squint angle of 26°.

The beams 142, 144, 138 and 140 which are angled to the left in the drawing are modulated with a predominance of 90 Hz modulation frequency. The beams 148, 146, 152 and 150 which are angled to the right are modulated with a predominance of 150 Hz modulating frequency. The receiver in the aircraft determines when the 150 Hz and 90 Hz signals are equal to thereby determine when the aircraft is in the guidance plane. If the aircraft is to the left of the guidance plane, the 90 Hz modulation predominates, telling the aircraft to fly right in order to get to the guidance plane. Similarly, if the aircraft receives a predominance of 150 Hz modulated signals, it is told to fly left. Thus, the guidance plane is defined by the balance of the modulating signals. In the arrangement illustrated, and with the specific angles enumerated, the cover beams 138 and 152 are intended to be relatively wide beams, and since they are emitted at a wide angle, they provide a correct signal to an aircraft which is substantially off course. However, the other beams are narrow beams and are at narrower angular spacings to provide a very accurate indication to the aircraft as it approaches the guidance plane. It will be understood that the specific beam angles given are those which have been found useful and are preferred in a particular physical embodiment. However, these angles, as well as other specific constants given in this disclosure may be varied and adjusted without departing from the spirit of the invention.

It is one of the important features and advantages of the invention that the azimuth pattern characteristics may be simply and economically varied, without changing the elevation patterns, by simply changing the wave guide feed radiators. It has been found, for instance, that in some detailed physical embodiments, the beams 142 and 148, which usually carry signals with greater relative depths of modulation than do the center beams 144 and 146, may be more advantageously located closer to the center of the array. Accordingly, in such embodiments, it has been found desirable to interchange the positions of the wave guides 16 and 16A. It has also been found to be possible to produce the different azimuth angles of the beams by physically rotating the individual wave guides 16-16C by predetermined angles upon the support plate 20 (in a plane parallel to plate 20). The different azimuth angles may be produced by a combination of "squint" angles and rotation. However, the preferred arrangement is to provide the desired azimuth beam angles entirely by means of the "squint" angle characteristics of the wave guides, keeping the slotted faces of the radiators mutually parallel. The best beam patterns are obtained in this manner.

A wide angle horn antenna radiator 162 is provided and mounted upon the common mounting plate 20 for directing a wide angle beam to the reflector 10 for transmission to the vehicle being guided, the beam signal being a standard reference frequency signal for stabilizing and enhancing the discrimination of the aircraft receiver. The elevation pattern of this beam is similar to the elevation patterns of the beams from the wave guides.

In a preferred physical embodiment of the apparatus, the reflector 10 is in the order of 3.2 meters in width, and the mounting plate 20 has a width equal to the width of the reflector.

FIG. 4 is a front view of the slotted face 17 of a typical slotted wave guide radiator such as the wave guide radiator 16 of FIG. 3. The energy is coupled into the interior of the wave guide from the associated coaxial cables and isolators through the back wall of the wave guide by means of probes indicated at 82 and 84. These probes extend into the interior of the wave guide typically to a dimension equivalent to at least one half of the depth of the wave guide, and they are preferably spaced from the adjacent end wall by one quarter of a wave length so that energy directed to the end wall is reflected in phase with energy directly radiated down the wave guide toward the other end wall. The end wall members 86 and 88 may be advantageously designed to be initially adjustable in and out of the end of the wave guide during fabrication so as to optimize the energy transfer from the probe to the interior of the wave guide by fine adjustment of the spacing between the probe and the end wall.

As illustrated, the slots H-A and B1-H1 are preferably staggered or alternated on opposite sides of the longitudinal center line 90 of the wave guide, the slot having the largest displacement from the center line (and thus the greatest coupling of energy out of the wave guide) being the slot A which is located at the transverse center line 92 of the wave guide. The slots have progressively smaller displacements from the center line 90 the farther the slots are positioned from the transverse center line 92. The center to center distances from slot to slot, such as from slot A to slot B and from slot B to slot C are uniform for a particular wave guide. This center to center distance between slots is the chief factor which determines the squint angle. This condition applies because the radiated frequency is held constant within narrow limits. Increasing the center to center slot spacing moves the beam away from the feed end of the wave guide radiator, and shortening the spacing moves the beam toward the feed end of the wave guide radiator.

The dimensions and spacings of the slots are preferably determined in accordance with the teachings available in the literature on the subject. For instance, attention is directed to chapters 2 and 9 of the *Antenna Engineering Handbook* edited by Henry Jasik and published in 1961 by McGraw-Hill Book Company of New York. Pages 9–5 through 9–18 are particularly pertinent. Slots of the type illustrated in FIG. 4 are referred to in the textbook as longitudinal shunt slots. As taught in the textbook, the number and spacing and arrangement of the slots not only determine the "squint" angle, but also the width and shape of the beam radiated by the wave guide. The textbook sections referred to above do not deal with the concept of driving the slotted wave guide from either end. Rather, the treatment contemplates driving the wave guide from only one end. When the wave guide is driven from only one end, the best arrangement of the slots is not symmetrical about the transverse center line 92, although the general arrangement of the slots with the wider offsets of slots appearing near the transverse center line 92 is applicable.

In carrying out the present invention, where it is desired to drive the wave guide from either end, it has been determined that it is desirable to make the wave guide slotted face symmetrical about the transverse center line 92. Thus, slot B1 has the same size, and the same displacement from the longitudinal axis 90 as does slot B. Slot C1 has the same size and displacement as slot C etc. It has been found to be quite effective to follow the design criteria set forth in the above mentioned textbook to determine the best size and displacement dimensions for the slots (H-B and A) in the driven end of the wave guide, and to make the slots (B1-H1) in the non-driven end symmetrical in size and spacing to those in the driven end. Stated another way, when the wave guide 16 is driven from the left end by a signal on probe 82, the slots H-A present the best textbook design for the production of the desired wave, and the remaining slots B1-H1 represent a slight compromise in sizes and spacings, but the compromise does not impair performance seriously. On the other hand, when the wave guide is driven from the right end by a signal on probe 84, the slots H1-B1,A present the ideal design parameters, while the slots B-H on the non-driven end represent a compromise. One result of this compromise is that a small additional amount of residual power must be absorbed in the isolators.

The invention also contemplates the possibility that there will be two "center" slots A and A1 equally spaced on opposite sides of the transverse center line 92, and equally spaced on opposite sides of the longitudinal center line 90, without any interruption in the staggered or alternating arrrangement of the slots on opposite sides of the longitudinal center line 90. The term "symmetrical" as used in describing the arrangements of slots in accordance with this invention is intended to include such an arrangement, even though it does not represent perfect symmetry on the two sides of the lateral center line 92, as the term is usually employed. However, the symmetry does exist in that the A and A1 slots are of equal size and are at equal offset distances from the longitudinal center line, as are all of the other complementarily identified slots B-B1, C-C1, etc.

Particular preferred physical embodiments are exemplified by the following data relating to wave guide radiators designed for operation at 5,002 MHz (actually intended to be operated in the range from 5,000 to 5,004 MHz), and employing a standard rectangular cross-section wave guide WR-187 having nominal inside dimensions of 2.215 cm. by 4.755 cm. The slots were cut to a uniform nominal width of 2.4 mm. The dimensions for the slot length and the offset displacement from the longitudinal center line for each slot for two different wave guides is given in the following table in millimeters. The two wave guides are distinguished in the table by specifying the squint angles at the heads of the appropriate columns. Thus, the first wave guide for which data is presented is identified as a 1.8° wave guide since it provides 1.8° squint angles. For accomplishing this squint angle, the uniform center to center spacing from each slot to each adjacent slot measured longitudinally is 40.26 mm. While only fifteen slots are illustrated in FIG. 4, the 1.8° wave guide employs seventeen slots, having added slots I and I1 at the respective ends and with a single center slot A which is centered on the transverse center line 92 as illustrated in FIG. 4. The typical dimension from the inside surface of the end of the wave guide to the center line of the adjacent end-most slot is equal to one wave length. The design data given for the 1.8° wave guide is for the production of a narrow beam which is only six degrees in width, defined by the condition that there is only a three degree angle on each side of the peak power center of the beam to the fifty percent power level side portions of the beam.

The second wave guide for which data is presented is identified as a 26° wave guide since it provides 26° squint angles. For accomplishing this squint angle, the uniform center to center spacing from each slot to each adjacent slot measured longitudinally is 24.61mm. This 26° wave guide contains ten slots, having two "center" slots A and A1 spaced on opposite sides of the longitudinal center line 90, and the transverse center line 92. Thus, the slots are again alternately spaced on opposite sides of the longitudinal center line, and the offset and length dimensions of the A and A1 slots are equal. The data given for the 26° wave guide is for the production of a relatively broad beam in azimuth which is in the order of 18° in width. This is the so-called "cover" beam.

TABLE I

| Slot Identification | 1.8 degree Wave Guide Length mm. | 1.8 degree Wave Guide Offset mm. | 26 degree Wave Guide Length mm. | 26 degree Wave Guide Offset mm. |
| --- | --- | --- | --- | --- |
| A, A1 | 32.23 | 12.383 | 32.26 | 14.859 |
| B, B1 | 32.18 | 11.623 | 32.05 | 12.040 |
| C, C1 | 32.05 | 10.864 | 31.88 | 7.620 |
| D, D1 | 31.85 | 9.378 | 31.60 | 3.505 |
| E, E1 | 31.65 | 7.496 | 31.29 | 1.676 |
| F, F1 | 31.42 | 5.613 | | |

TABLE I-continued

| Slot Identification | 1.8 degree Wave Guide Length mm. | 1.8 degree Wave Guide Offset mm. | 26 degree Wave Guide Length mm. | 26 degree Wave Guide Offset mm. |
| --- | --- | --- | --- | --- |
| G, G1 | 31.42 | 4.128 | | |
| H, H1 | 31.39 | 2.609 | | |
| I, I1 | 31.29 | 1.882 | | |

Figure 5:
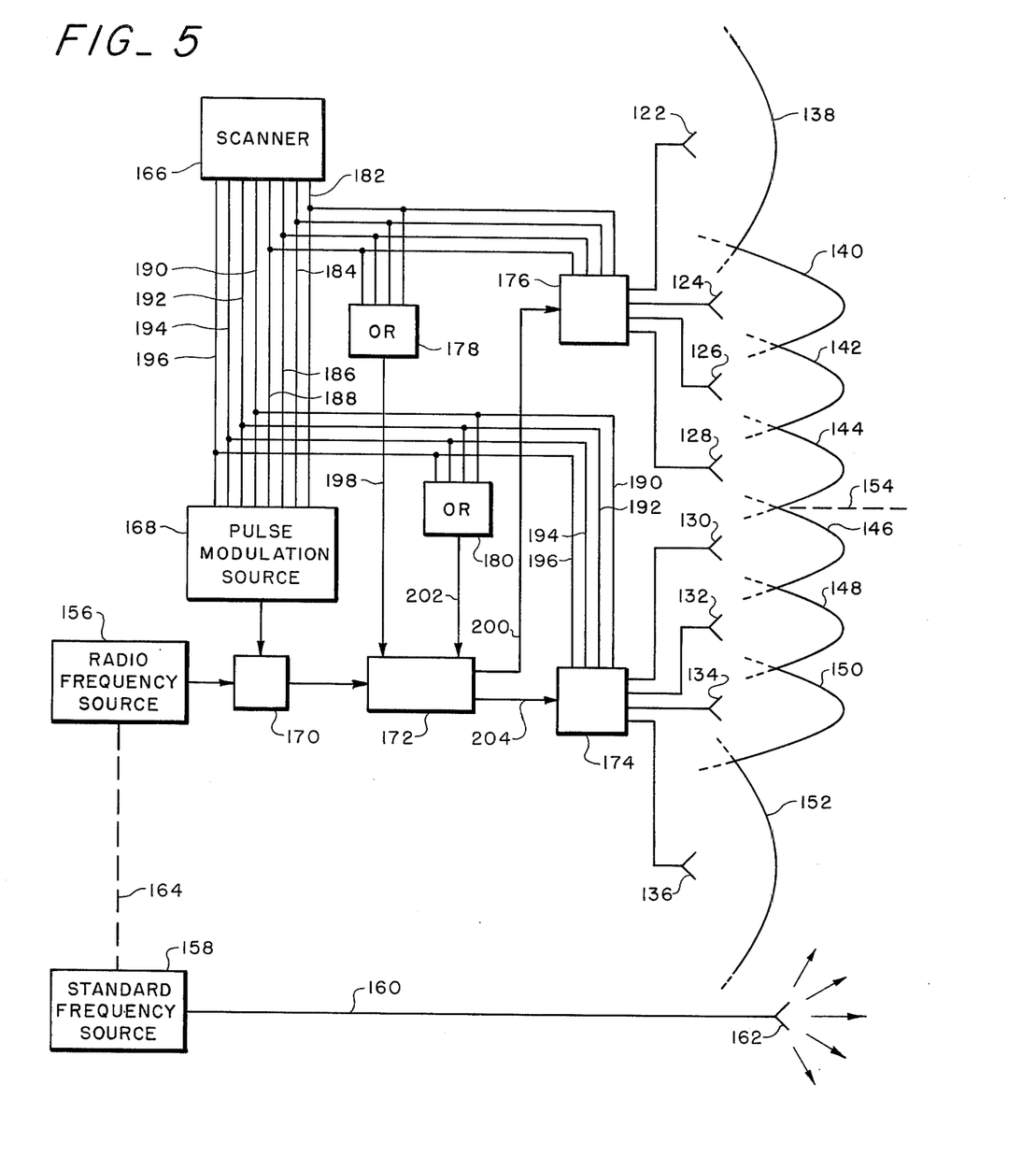
FIG. 5 is a schematic circuit diagram of a transmitter with which the present invention is particularly useful.

FIG. 5 illustrates a schematic circuit diagram of a localizer transmitter which may be employed with the antenna array system of the present invention in a preferred embodiment. Signals are supplied by the transmitter to the antenna elements (sometimes referred to below simply as "antennas") schematically illustrated in FIG. 5 as separate elements 122–136. These antenna elements are schematically positioned to correlate with their separate contributions to the combined signal pattern which is radiated by the combination of antenna elements. However, in accordance with the present invention, the functions of separate pairs of the elements 122-136 are performed by the slotted wave guides previously discussed above. Thus, elements 128 and 130 are combined in the slotted wave guide radiator 16A of FIG. 3 to provide the individual beams 144 and 146 illustrated in FIG. 3 by the center lines of those beams. Those same beams are illustrated as separate beam outlines 144 and 146 in FIG. 5. Similarly, the antenna elements 126 and 132 are functionally combined in the slotted wave guide 16 of FIG. 3 to generate the beams 142 and 148, and elements 124 and 134 are combined in slotted wave guide 16C of FIG. 3, and elements 122 and 136 are combined in slotted wave guide radiator 16B of FIG. 3.

The antennas 122–136, and the associated beams 138-152, are symmetrically arranged on opposite sides of the course plane in space indicated by the dotted line 154. This is the navigational course plane defined by the transmitter. The radio signals radiated from all of the antenna elements 122-136 are at the same carrier frequency. However, the navigation plane 154 is defined by providing ddifferent proportions of modulating frequency tones at 90 and 150 Hz in the respective beams on opposite sides of the plane 154. Thus, the 90 Hz modulation predominates in the beams 144, 142, 140, and 138; and the 150 Hz modulation predominates in the beams 146, 148, 150, and 152. The beams 138-152 are sometimes referred to collectively as constituting a switched scanning beam, and the individual beams 138-152 are referred to as providing individual switched portions of the scanning beam.

Since the transmitter illustrated in this drawing is intended for use for a localizer system, the course plane 154 defined by the navigation signals is a vertical plane for guidance of an aircraft in azimuth. Thus, if an aircraft is approaching the transmitter, it receives guidance signals which are balanced when it is in the navigation plane 154, and which direct it to turn left or right to achieve a course in the guidance plane 154 if it is not in that plane.

The arrangement of the antennas 122-136 and the beams 138-152 in this drawing are schematic representations only. The actual radiation beams are directed radially outwardly in a fan configuration, rather than in a parallel beam configuration as illustrated. The separations of the beams 138-152 in the vertical dimension in this drawing are thus representative of angular separations of the beams in the actual radiation pattern. For instance, typical center to center angular separations between adjacent beams in the central group of beams 140-150 may be 3.6°. Preferred spacings in one embodiment disclosed above in connection with FIG. 3 are 3.6° between the center beams 144 and 146, 2.7° from each center beam, such as 146, to the next adjacent side beam 148, and 4.5° to the next further side beam 150. The members of the central group of beams 140-150 are preferably narrow beams having a width of only about 6°. The clearance beams 138 and 152 are of reduced peak energy level, and at wide angles in order to provide a "capture" signal for approaching aircraft and to cover the side lobes of the more central beams.

The various beams are radiated from the various antenna elements 122-136 by rapidly switching radio frequency energy from one antenna element to another. The energy may come from a single radio frequency source 156. This arrangement is referred to as a switched scanning beam system, and it is carried out in accordance with the teachings of a related U.S. Pat. No. 3,774,214 which issued Nov. 20, 1973 for a SCANNING BEAM GUIDANCE METHOD AND SYSTEM, and which is assigned to the same assignee as the present application.

A standard reference frequency signal from a radio frequency source 158 is connected at 160 to radiate from an antenna element 162 (illustrated as a horn 162 in FIG. 3) a standard reference frequency signal for stabilizing and enhancing the discrimination of the aircraft receiver. The horn antenna element 162 provides for a wide angle of transmission, encompassing the entire angular field of the navigation signal beams 138-152, and it is preferably a continuous wave signal in contrast to the discontinuous nature of each of the beams 138-152 of the navigation signals.

The radio frequency source 156 and the standard frequency source 158 may operate completely independently of one another. However, the difference between the frequencies from these two sources must be maintained at a substantially constant value. This may be done by frequently, or constantly, monitoring the freuqency difference between the two, or by providing a control connection between the two so that one is controlled by the other. This interrelationship, and possible interconnection, is signified by the dotted line 164.

In addition to the radio frequency source 156, the transmitter system feeding the antennas 122-136 includes a scanner 166, a pulse modulation source 168 controlled by the scanner, and a modulator gate 170 controlled by the pulse modulation source 168. The transmitter also includes gating devices 172, 174, and 176, by means of which the modulated radio frequency signals are gated to the respective antenna elements 122-136. The switches 172-176 are also controlled by the scanner 166. The control of gate 172 is accomplished through logic OR gates 178 and 180. The switches 172-176 and OR gates 178 and 180 may all be incorporated within the switch 46 previously described in FIG. 3. The modulation provided by the pulse modulation source 168 is preferably a pulse duration modulation in which the modulation is synchronized with the scanning of the beam by the switching of the beam from one antenna element to another. Thus, as the radio frequency is switched to each antenna element 122-136, the duration of the pulse (actually a burst of radio frequency energy) is carefully controlled at gate 170 by the pulse modulation source 168 to provide the desired modulation on that particular beam. Since the pattern of modulation to be provided on each of the various beams is constant, there is a complete repetition of the modulation sequence and therefore the different modulation signals required for the different sequences of pulses for each beam can be built into the pulse modulation source. Preferably, the pulse modulation is carried out by means of digital circuits and by means of digital synthesis of the modulation in accordance with the teachings of a prior related patent application Ser. No. 198,839 filed Nov. 15, 1971 by Donald J. Toman for a MODULATION SYNTHESIS METHOD AND APPARATUS and assigned to the same assignee as the present application.

The scanner 166 is operable to issue timing signals in a sequence on the output lines 182 through 196 to control the gating of energy respectively to the antenna elements 122-136, and to control the operation of the pulse modulation source 168 to provide the appropriate modulation in synchronism with the switching of the energy to the respective antenna elements. The scanner provides an output on only one of the output connections 182-196 at any one time. For instance, at the interval when the scanner provides an output at connection 182, that output is received by the pulse modulation source 168, and also by the OR gate 178 and the switch 176. As a result of the signal received by the OR gate 178, an output is provided from that OR gate on connection 198 to the switching device 172, controlling that switching device to cause the radio frequency energy received from the modulation gate 170 to be switched through connection 200 to the four-way gate 176. Concurrently, the scanner signal on connection 182 received by the four-way switch 176 causes the radio frequency energy to be switched to the antenna element 122. In similar fashion, scanner signals on any one of the outputs 184, 186, and 188 energize the OR gate 178 to switch the radio frequency energy to the switch 176, where that energy is in turn switched respectively to the antenna elements 124, 126, and 128. Similarly, scanner signals on connections 190, 192, 194, and 196, switch the radio frequency energy respectively to the antenna elements 130, 132, 134, and 136. The switches 172, 174, and 176 may be microwave switches of the type referred to as shunt-diode switches, and may employ PIN diodes. The term "serveral" as used in this specification means a few, but more than two.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. An antenna array for radiating a partern of angularly spaced microwave radio beams which are particularly useful to provide localizer signals for instrument guidance of aircraft comprising a radiation reflector in the form of a sector of a concave cylinder having substantially open ends, said relector being arranged facing in a substantially horizontal direction and such that the parallel cylinder generation element lines thereof are substantially horizontal, a plurality of slotted wave guide microwave signal radiating elements horizontally positioned below the focal plane of the reflector and at an angle thereto and arranged to direct microwave energy directly to said reflector for reflection thereby, said radiating elements being positioned and operable to direct radiation in serval separate narrow beams to said reflector at different azimuth angles and such that the center lines of said beams are in substantial alignment in elevation within a common plane, the reflected beams having uniform elevation patterns as determined primarily by the cylindrical curvature and the elevation rotational position of said radiation reflector and substantially independent of the different azimuth angles of said beams, and the reflected beams having different azimuth angles and selected azimuth patterns symmetrical about the respective center lines thereof as determined primarily by the radiation characteristics of said radiating elements and substantially independent of the characteristics of said radiation reflector.

2. An antenna array for radiating a pattern of angularly spaced microwave radio beams which are particularly useful to provide localizer signals for instrument guidance of aircraft comprising a radiation reflector in the form of a sector of a concave cylinder, said reflector being arranged facing in a substantially horizontal direction and such that the parallel cylinder generation element lines thereof are substantially horizontal, a plurlaity of slotted wave guide microwave signal radiating elements horizontally positioned and arranged to direct microwave energy directly to said reflector for reflection thereby, said radiating elements being positioned and operable to direct radiation in separate beams to said reflector at different azimuth angles and such that the center lines of said beams are in substantial alignment in elevation within a common plane, the reflected beams having uniform elevation patterns as determined primarily by the cylindrical curvature and the elevation rotational position of said radiation reflector and substantially independent of the different azimuth angles of said beams, and the reflected beams having different azimuth angles and selected azimuth patterns determined primarily by the radiation characteristics of said radiating elements and substantially independent of the characteristics of said radiation reflector, the upper portion of said radiation reflector generally corresponding in shape to a parabolic cylinder sector and the lower portion of said reflector having a sharper curvature and merging into a shape more generally corresponding to a circular cylinder sector, said reflector being arranged such that the axis plane of the parabolic cylinder sector is substantially horizontal, the curvature of the reflector being operable to provide a reversal of the reflected beam portions such that the upper portion of said radiation reflector determines the character of the lower portions of the reflected beams and the lower portion of said reflector determines the character of the upper portions of the reflected beams.

3. An antenna array as claimed in claim 2 wherein said radiating elements are oriented to direct radiation diagonally upwardly toward said reflector in beams that are uniform and relatively wide in elevation to illuminate substantially the entire reflector as viewed in elevation, said radiating elements being positioned below the paths of all of the reflected beam portions corresponding to geometrically optically reflected beam elements.

4. An antenna array for radiating a pattern of angularly spaced microwave radio beams which are particularly useful to provide localizer signals for instrument guidance of aircraft comprising a radiation reflector in the form of a sector of a concave cylinder, said reflector being arranged facing in a substantially horizontal direction and such that the parallel cylinder generation element lines thereof are substantially horizontal, a plurality of slotted wave guide microwave signal radiating elements horizontally positioned below the focal plane of the reflector and at an angle thereto and arranged to direct microwave energy directly to said reflector for reflection thereby, said radiating elements being positioned and operable to direct radiation in serveral separate narrow beams to said reflector at different azimuth angles and such that the center lines of said beams are in substantial alignment in elevation within a common plane, the reflected beams having uniform elevation patterns as determined primarily by the cylindrical curvature and the elevation rotational position of said radiation reflector and substantially independent of the different azimuth angles of said beams, and the reflected beams having different azimuth angles and selected azimuth patterns symmetrical about the respective center lines thereof as determined primarily by the radiation characteristics of said radiating elements and substantially independent of the characteristics of said radiation reflector, said antenna array being a switched scanning beam array including switching means connected to said radiating elements to switch microwave carrier energy in a sequence from one beam to another to thereby produce a switched scanning beam.

5. An antenna array as claimed in claim 4 wherein said slotted wave guide microwave signal radiating elements each include means for separately introducing signals at each end thereof, each of said wave guides being designed with the positions of the slots in the slotted wall thereof arranged so as to provide radiation directed outwardly at predetermined angles referred to as squint angles of deviation away from a direction normal to the slotted face of the wave guide.

said squit angles being dependent upon the direction of progagation of the signal through the wave guide so that oppositely disposed squint angles are provided when the wave guide is fed from opposite ends.

6. An antenna array for radiating a pattern of angularly spaced microwave radio beams which are particularly useful to provide localizer signals for instrument guidance of aircraft comprising a radiation reflector in the form of a sector of a concave cylinder, said reflector being arranged facing in a substantially horizontal direction and such that the parallel cylinder generation element lines thereof are substantially horizontal, a plurality of slotted wave guide microwave signal radiating elements horizontally positioned and arranged to direct microwave energy directly to said reflector for reflection thereby, said radiating elements being positioned and operable to direct radiation in separate beams to said reflector at different azimuth angles and such that the center lines of said beams are in substantial alignment in elevation within a common plane, the reflected beams having uniform elevation patterns as determined primarily by the cylindrical curvature and the elevation rotational position of said radiation reflector and substantially independent of the different azimuth angles of said beams, the reflected beams having different azimuth angles and selected aximuth patterns determined primarily by the radiation characteristics of said radiating elements and substantially independent of the characteristics of said radiation reflector, said antenna array being operable as a switched schanning beam antenna array in which carrier energy is switched in a sequence from one beam to another, said slotted wave guide microwave signal radiating elements each including means for separately introducing signals at each end thereof, each of said wave guides being designed with the positions of the slots in the slotted wall thereof arranged so as to provide radiation directed outwardly at predetermined angles referred to as squint angles of deviation away from a direction normal to the slotted face of the wave guide, said squint angles being dependent upon the direction of propagation of the signal through the wave guide so that oppositely disposed squint angles are provided when the wave guide is fed from opposite ends, all of said wave guide radiators being in substantial alignment in parallel with said reflector and said wave guide radiators being respectively designed to provide different squint angles so that respective pairs of beams available from each radiating element complement the beams from other radiating elements to provide beams having different desired angular spacings.

7. An antenna array as claimed in claim 5 wherein said means for separately introducing signals at each end of each slotted wave guide includes an isolator operable to pass the signal into the associated end of the wave guide but operable to act as a non-reflective load for any signal propagated from the opposite end of the wave guide.

8. An antenna array as claimed in claim 5 wherein the slots in said slotted wave guide microwave signal radiating elements comprise longitudinal shunt slots.

9. An antenna array as claimed in claim 8 wherein each of said slotted wave guide microwave signal radiating elements includes a plurality of slots arranged at various interally offset spacings from the longitudinal axis of the wave guide, the slot having the largest lateral offset spacing being located nearest the lateral center line of the wave guide, and the slots having progressively reduced offset spacings at successive positions progressing from the lateral center line toward each end of the wave guide.

10. An antenna array as claimed in claim 9 wherein the slots of said slotted wave guide microwave signal radiating elements are progressively slightly longer in coordination with the spacing from the end of the wave guide to the lateral center line of the wave guide.

11. An antenna array as claimed in claim 9 wherein the slots of said slotted wave guide microwave signal radiating elements are staggered on opposite sides of the longitudinal center line of the slotted face of each wave guide.

12. An antenna array as claimed in claim 11 wherein the pattern of slots is symmetrical about the transverse center line of each slotted wave guide.

13. An antenna array as claimed in claim 12 wherein the slots on each side of the transverse center line of each slotted wave guide are positioned and dimensioned for optimum performance in coupling energy introduced at the end of the associated side of the wave guide.

14. An antenna array as claimed in claim 2 wherein said common plane of the center lines of said beams is inclined upwardly from said radiating elements to said radiation reflector from a position near said axis plane of said reflector.

15. An antenna array as claimed in claim 14 wherein said common plane of the center lines of said beams is inclined at an angle in the neighborhood of 45°.

* * * * *

UNITED STATES PATENT OFFICE
CERTIFICATE OF CORRECTION

PATENT NO. : 3,931,624
DATED : January 6, 1976
INVENTOR(S) : WARREN HUNDLEY and MICHAEL A. EOVINE It is certified that error appears in the above-identified patent and that said Letters Patent are hereby corrected as shown below:

Column 1, line 17, Serial Number should be --198,839--;
          line 48, "narow" should read --narrow--.
Column 3, line 65, "axis plane 3" should read --axis plane 30--.
Column 5, line 10, "refelctor" should read --reflector--.
Column 6, line 1, after "three" the word --degree-- has been omitted.
Column 16, line 60, "squit" should read --squint--.
Column 17, line 22, "aximuth" should read --azimuth--.
Column 18, line 15, "interally" should read --laterally--.

Signed and Sealed this twentieth Day of April 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,931,624
DATED : January 6, 1976
INVENTOR(S) : WARREN HUNDLEY and MICHAEL A. EOVINE It is certified that error appears in the above-identified patent and that said Letters Patent are hereby corrected as shown below:

Column 4, last line, "Refelctors" should read --Reflectors--.
Column 5, line 55, "clearly" should read --closely--.
Column 12, line 41, "ddifferent" should read --different--.
Column 13, line 42, "freuqency" should read -- frequency--.
Column 14, line 48, "serveral" should read --several--;
         line 58, "I Claim" should read --Claims--;
         line 59, "partern" should read --pattern--;
         line 65, "relector" should read --reflector--.
Column 15, line 7, "serval" should read --several--;
         line 34, "plurlaity" should read --plurality--.
Column 16, line 27, "serveral" should read --several--;
         line 61, "progagation" should read --propagation--.
Column 17, line 27, "schanning" should read --scanning--.

Signed and Sealed this

Seventh Day of December 1976

[SEAL]

Attest:

RUTH C. MASON
Attesting Officer

C. MARSHALL DANN
Commissioner of Patents and Trademarks